US010789056B2

(12) United States Patent
Yamada et al.

(10) Patent No.: US 10,789,056 B2
(45) Date of Patent: Sep. 29, 2020

(54) TECHNOLOGIES FOR SCALABLE TRANSLATION CACHING FOR BINARY TRANSLATION SYSTEMS

(71) Applicant: Intel Corporation, Santa Clara, CA (US)

(72) Inventors: Koichi Yamada, Los Gatos, CA (US); Jose A. Baiocchi Paredes, Santa Clara, CA (US); Abhik Sarkar, San Jose, CA (US); Ajay Harikumar, Bangalore (IN); Jiwei Lu, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 62 days.

(21) Appl. No.: 15/202,745

(22) Filed: Jul. 6, 2016

(65) Prior Publication Data

US 2018/0011696 A1 Jan. 11, 2018

(51) Int. Cl.
*G06F 8/52* (2018.01)
*G06F 8/61* (2018.01)

(52) U.S. Cl.
CPC . *G06F 8/52* (2013.01); *G06F 8/61* (2013.01)

(58) Field of Classification Search
CPC .................................................. G06F 8/00–78
See application file for complete search history.

(56) References Cited

U.S. PATENT DOCUMENTS

| 8,286,145 B2* | 10/2012 | Kawabata | G06F 8/4441 |
| | | | 717/136 |
| 9,405,937 B2* | 8/2016 | Malka | G06F 21/74 |
| 9,928,067 B2* | 3/2018 | Zhong | G06F 9/30181 |

(Continued)

FOREIGN PATENT DOCUMENTS

WO  WO 2014/209361  * 12/2014 ............... G06F 9/38

OTHER PUBLICATIONS

Kyle, Stephen, et al. "Efficiently parallelizing instruction set simulation of embedded multi-core processors using region-based just-in-time dynamic binary translation." ACM SIGPLAN Notices 47.5 (2012): p. 21-30. (Year: 2012).*

(Continued)

*Primary Examiner* — Doon Y Chow
*Assistant Examiner* — Joanne G Macasiano
(74) *Attorney, Agent, or Firm* — Barnes & Thornburg LLP

(57) ABSTRACT

Technologies for binary translation include a computing device that allocates a translation cache shared by all threads associated with a corresponding execution domain. The computing device assigns a thread to an execution domain, translates original binary code of the thread to generate translated binary code, and installs the translated binary code into the corresponding translation cache for execution. The computing device may allocate a global region cache, generate region metadata associated with the original binary code of a thread, and store the region metadata in the global region cache. The original binary code may be translated using the region metadata. The computing device may allocate a global prototype cache, translate the original binary code of a thread to generate prototype code, and install the prototype code in the global prototype cache. The prototype code may be a non-executable version of the translated binary code. Other embodiments are described and claimed.

17 Claims, 3 Drawing Sheets

(56) References Cited

U.S. PATENT DOCUMENTS

| | | | | |
|---|---|---|---|---|
| 2008/0295082 | A1* | 11/2008 | Kawabata | G06F 8/4441 |
| | | | | 717/136 |
| 2009/0271771 | A1* | 10/2009 | Fallows | G06F 9/45516 |
| | | | | 717/137 |
| 2014/0304493 | A1* | 10/2014 | Zhong | G06F 9/30181 |
| | | | | 712/226 |
| 2015/0007304 | A1* | 1/2015 | Malka | G06F 21/54 |
| | | | | 726/17 |
| 2016/0188372 | A1* | 6/2016 | Sarkar | G06F 8/61 |
| | | | | 718/103 |
| 2016/0378446 | A1* | 12/2016 | Ince | G06F 8/52 |
| | | | | 717/136 |
| 2017/0371634 | A1* | 12/2017 | Ince | G06F 9/45516 |

OTHER PUBLICATIONS

Wang, Zhaoguo, et al. "COREMU: a scalable and portable parallel full-system emulator." Proceedings of the 16th ACM symposium on Principles and practice of parallel programming. 2011. (Year: 2011).*

D'Antras, Amanieu, et al. "Optimizing indirect branches in dynamic binary translators." ACM Transactions on Architecture and Code Optimization (TACO) 13.1 (Apr. 2016): 1-25. (Year: 2016).*

* cited by examiner

TECHNOLOGIES FOR SCALABLE TRANSLATION CACHING FOR BINARY TRANSLATION SYSTEMS

BACKGROUND

Computer processors typically execute binary code encoded in a particular instruction set. Binary translation translates binary code targeted for a particular instruction set into translated binary code, generally targeted for another instruction set. Binary translation may be used to enable backward- or forward-compatibility for software applications, or to improve processing efficiency. For example, binary code targeted for a reduced instruction set computing (RISC) architecture such as PowerPC may be translated into binary code targeting a complex instruction set computing (CISC) architecture such as IA-32, allowing legacy applications to run on newer hardware. As another example, binary translation may generate translated binary code targeting the same computer architecture but optimized by using newer features such as wider instructions, improved vector instructions, or the like. Binary translation may be dynamic, that is, the code may be translated as it is executed.

Certain binary translation systems may establish one or more translation caches (T-caches) to store translated binary code. In a private T-cache system, the system allocates a dedicated T-cache for each thread. Thus, the total memory needed for T-caches in a private T-cache system increases with the number of threads. In a shared T-cache system, the system allocates a single T-cache that is shared across threads. For shared T-cache systems, lock contention may increase with the number of threads.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
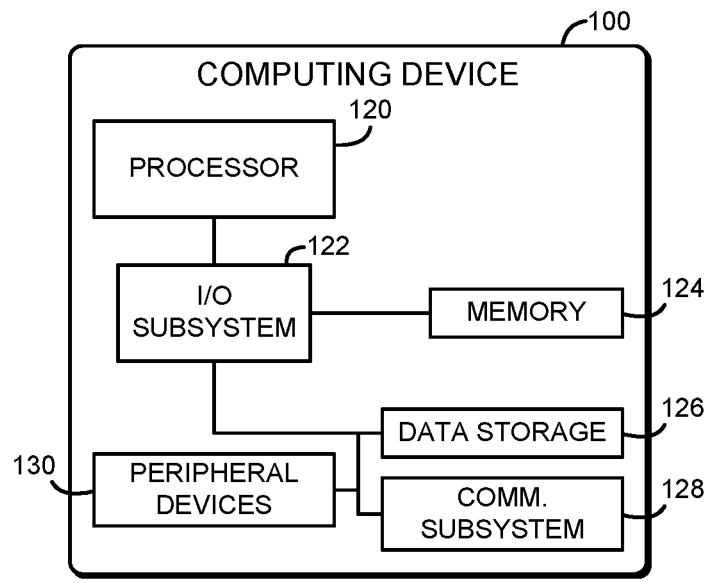
FIG. 1 is a simplified block diagram of at least one embodiment of a computing device for binary translation with scalable translation caching.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a computing device 100 for binary translation with scalable translation caching includes a processor 120 and memory 124. In use, as described further below, the computing device 100 allocates one or more translation caches. Each translation cache is shared by all threads associated with a corresponding execution domain. The computing device 100 may also allocate a global region cache and/or a global prototype cache. The computing device 100 may execute a binary translation process for each thread, which includes a region formation operation, a translation operation, and an installation operation. During the region formation operation, the computing device 100 generates transaction region metadata, which may be cached in the global region cache. During the translation operation, the computing device 100 translates an original binary code of a program associated with the thread into translated prototype code, which may be cached in the global prototype cache. During the installation operation, the prototype code is installed into the translation cache associated with the corresponding thread for execution. Thus, by using shared translation caches for each execution domain, the computing device 100 may reduce contention between threads compared to using a global translation cache. Additionally, the computing device 100 may reduce memory consumption and re-translation overhead by using a global region cache and/or prototype cache. Further, the computing device 100 is highly configurable and scalable depending on thread count and/or available hardware resources. For example, the computing device 100 may be capable of scaling from a single execution domain and/or single thread all the way to a massively multithreaded system with many execution domains.

The computing device 100 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively includes a processor 120, an input/output subsystem 122, a memory 124, a data storage device 126, and a communication subsystem 128. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Thus, the processor 120 may include multiple hardware threads, logical processors, cores, or other execution contexts capable of executing concurrently. The memory 124 may be embodied as any type of volatile or non-volatile memory or data storage capable of performing the functions described herein. In operation, the memory 124 may store various data and software used during operation of the computing device 100 such as operating systems, applications, programs, libraries, and drivers.

The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication subsystem 128 of the computing device 100 may be embodied as any communication circuit, device, or collection thereof, capable of enabling communications between the computing device 100 and other remote devices over a network. The communication subsystem 128 may be configured to use any one or more communication technology (e.g., wired or wireless communications) and associated protocols (e.g., Ethernet, Bluetooth®, Wi-Fi®, WiMAX, etc.) to effect such communication.

As shown, the computing device 100 may also include one or more peripheral devices 130. The peripheral devices 130 may include any number of additional input/output devices, interface devices, and/or other peripheral devices. For example, in some embodiments, the peripheral devices 130 may include a display, touch screen, graphics circuitry, keyboard, mouse, speaker system, microphone, network interface, and/or other input/output devices, interface devices, and/or peripheral devices.

Figure 2:
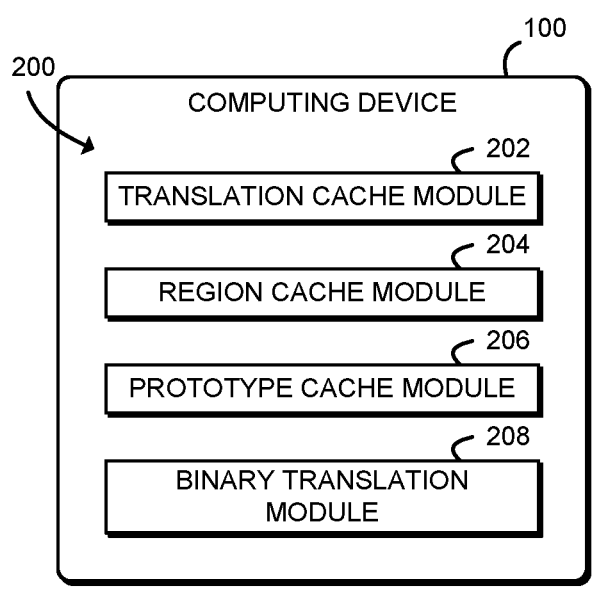
FIG. 2 is a simplified block diagram of at least one embodiment of an environment that may be established by the computing device of FIG. 1.

Referring now to FIG. 2, in an illustrative embodiment, the computing device 100 establishes an environment 200 during operation. The illustrative environment 200 includes a translation cache module 202, a region cache module 204, a prototype cache module 206, and a binary translation module 208. The various modules of the environment 200 may be embodied as hardware, firmware, software, or a combination thereof. As such, in some embodiments, one or more of the modules of the environment 200 may be embodied as circuitry or collection of electrical devices (e.g., translation cache circuitry 202, region cache circuitry 204, prototype cache circuitry 206, and/or binary translation circuitry 208). It should be appreciated that, in such embodiments, one or more of the translation cache circuitry 202, the region cache circuitry 204, the prototype cache circuitry 206, and/or the binary translation circuitry 208 may form a portion of one or more of the processor 120, the I/O subsystem 122, and/or other components of the computing device 100. Additionally, in some embodiments, one or more of the illustrative modules may form a portion of another module and/or one or more of the illustrative modules may be independent of one another.

The translation cache module 202 is configured to allocate one or more translation caches in the memory 124. Each translation cache is shared by all threads associated with a corresponding execution domain of the computing device 100. The threads may be embodied as hardware threads executed by logical processor(s) of the computing device 100, software threads, or other execution contexts. Each thread may be associated with a computer program including original binary code. The translation cache module 202 may be further configured to determine whether translated binary code exists in each translation cache. The translated binary code is associated with an instruction pointer address of a thread, and the instruction pointer address refers to a location within an original binary code of the program associated with the corresponding thread.

The region cache module 204 is configured to allocate a global region cache in the memory 124. The global region cache is shared by threads associated with any execution domain of the computing device 100. The region cache module 204 is further configured to generate translation region metadata associated with the original binary code of a program associated with a corresponding thread and store the translation region metadata in the global region cache. The region cache module 204 may be further configured to determine whether translation region metadata associated with original binary code of a program associated with a thread exists in the global region cache and to generate the translation region metadata in response to determining that the translation region metadata does not exist in the global region cache.

The prototype cache module 206 is configured to allocate a global prototype cache in the memory 124. The global prototype cache is shared by threads associated with any execution domain of the computing device 100. The prototype cache module 206 is further configured to install prototype code associated with the original binary code of a program associated with a corresponding thread into the global prototype cache in response to translation of the original binary code. The prototype code may be embodied as a non-executable version of translated binary code. The translated binary code, based on the corresponding prototype code, may be installed into a corresponding translation cache as described further below. The prototype cache module 206 may be further configured to determine whether prototype code associated with an original binary code of a program associated with a corresponding thread exists in the global prototype cache. The prototype code may be stored in a global storage area of the global prototype cache, or in a translation cache shared by all threads associated with a different execution domain.

The binary translation module 208 is configured to assign one or more threads to each of the execution domains, to translate the original binary code of the program associated with each thread to generate a corresponding translated binary code, and to install the translated binary code into the corresponding translation cache for execution. As described above, the translated binary code may be based on corresponding prototype code copied from the global prototype cache. The prototype code may be generated using transaction region metadata stored in the global region cache. The original binary code may target one instruction set architecture, and the translated binary code may target a different instruction set architecture. The binary translation module 208 may be further configured to execute the translated binary code in response to installing the translated binary code into the corresponding translation cache.

Figure 3:
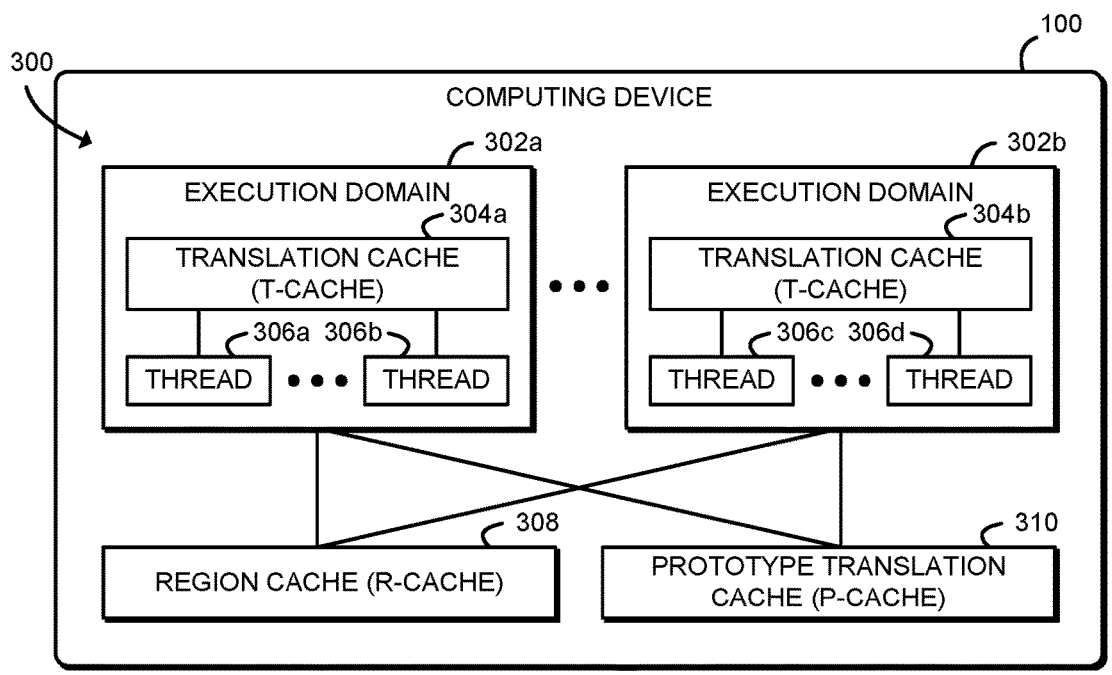
FIG. 3 is a simplified block diagram of at least one embodiment of a cache structure that may be established by the computing device of FIGS. 1-2.

Referring now to FIG. 3, in an illustrative embodiment, the computing device 100 establishes a cache structure 300 during operation. As shown, the computing device 100 establishes one or more execution domains 302. For each execution domain 302, the computing device 100 allocates a translation cache 304 in the memory 124 that is associated with one or more threads 306. Each translation cache 304 stores executable translated binary code that has been produced by a binary translation process. The translated binary code may be directly executable the processor 120. As described further below, each translation cache 304 is shared by the threads 306 of the corresponding execution domain 302. For example, in the illustrative embodiment the computing device 100 establishes two execution domains 302a, 302b. The execution domains 302a, 302b each allocate a translation cache 304a, 304b, respectively. As shown, the translation cache 304a is shared by threads 306a, 306b of the execution domain 302a, and the translation cache 304b is shared by threads 306c, 306d of the execution domain 302b. Although illustrated with two execution domains 302, it should be understood that in some embodiments the computing device 100 may establish many more execution domains 302 (e.g., for large thread counts), and in some embodiments the computing device 100 may establish a single execution domain 302 (e.g., for relatively small thread counts). Similarly, although illustrated with two threads 306 per execution domain 302, it should be understood that in some embodiments the computing device 100 may establish a single thread 306 per execution domain 302.

The computing device 100 also allocates a global region cache (R-cache) 308 and a global prototype translation cache (P-cache) 310 in the memory 124. The R-cache 308 includes translation region metadata used by the binary translation process. The translation region metadata may include the control flow graph of the original binary code, the original instruction data of the original binary code, and/or other metadata that may be used by the binary translation process. The P-cache 310 functions as a backing store for the translation caches 304, and may include prototype code, which may be embodied as a non-executable version of the translated binary code (e.g., translated binary code prior to performing address binding). In some embodiments, the P-cache 310 may store multiple versions of the prototype code for the same search key or index, thus simplifying version management. The P-cache 310 may store the prototype code in a global structure in the memory 124, or may look up translated binary code stored in the translation caches 304 associated with different execution domains 302. As described further below, the R-cache 308 and the P-cache 310 are shared by all the threads 306 of the computing device 100; that is, the R-cache 308 and the P-cache 310 are shared by threads 306 associated with any execution domain 302. As described above, the T-caches 304, the R-cache 308, and the P-cache 310 are all stored in the memory 124, or in some embodiments, in the data storage device 126. In response to memory pressure, the computing device 100 may evict data from any of the T-caches 304, the R-cache 308, and/or the P-cache 310 depending on optimization vectors and the capabilities of the computing device 100. Additionally, although illustrated as including both the R-cache 308 and the P-cache 310, it should be understood that both the R-cache 308 and the P-cache 310 are optional components of the cache structure 300. Particularly for embodiments with a relatively low thread count, the computing device 100 may not allocate the R-cache 308 and/or the P-cache 310.

Figure 4:
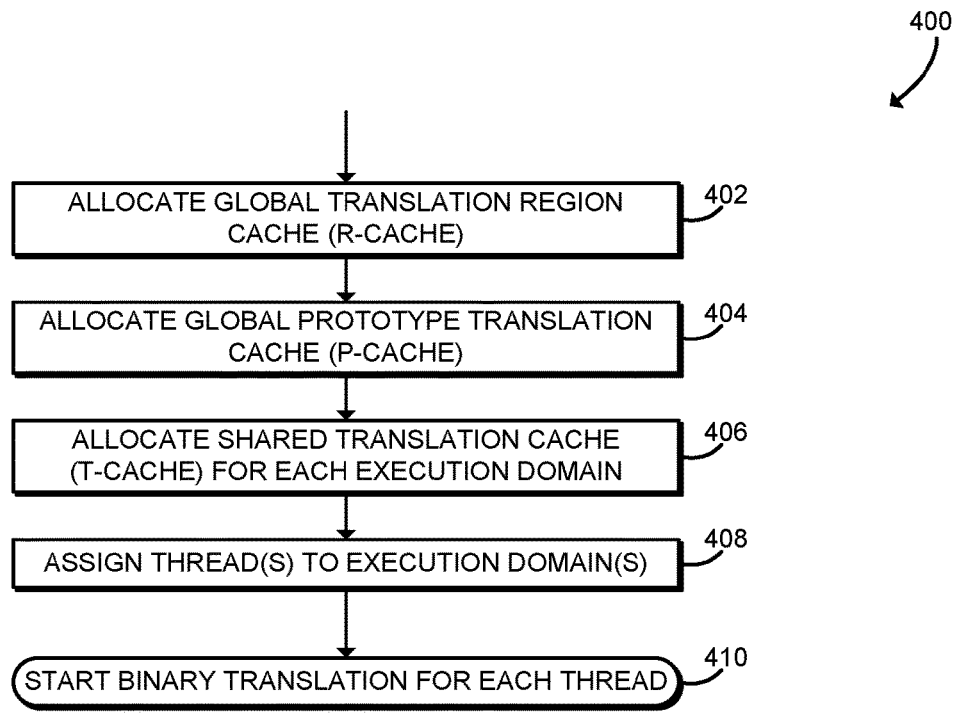
FIG. 4 is a simplified flow diagram of at least one embodiment of a method for allocating the cache structure that may be executed by the computing device of FIGS. 1-3.

Referring now to FIG. 4, in use, the computing device 100 may execute a method 400 for allocating a cache structure. The method 400 begins in block 402, in which the computing device 100 may allocate the global region cache (R-cache) 308 in the memory 124. As described above, the R-cache 308 includes translation region metadata used by the binary translation process. For example, the translation region metadata may include the control flow graph of the original binary code, the original instruction data of the original binary code, and/or other metadata that may be used by the binary translation process. Caching the translation region metadata may improve performance by reducing the time spent performing region formation. The R-cache 308 operates as a backing store for the translation region metadata and thus is not required for correctness. Accordingly, in some embodiments the computing device 100 may not allocate an R-cache 308.

In block 404, the computing device 100 may allocate the global prototype translation cache (P-cache) 310 in the memory 124. As described above, the P-cache 310 functions as a backing store for the translation caches 304, and may include prototype code, which may be embodied as a non-executable version of the translated binary code (e.g., translated binary code prior to performing address binding). In some embodiments, the computing device 100 may allocate a global structure in the memory 124 to store the prototype code in the P-cache 310. Additionally or alternatively, in some embodiments the P-cache 310 look up or otherwise access translated binary code stored in the translation caches 304 associated with different execution domains 302. Caching the prototype code may improve performance by reducing the time spent in retranslation. The P-cache 310 operates as a backing store for the translation caches 304 and thus is not required for correctness. Accordingly, in some embodiments the computing device 100 may not allocate a P-cache 310.

In block 406, the computing device 100 allocates a shared translation cache 304 in the memory 124 for each execution domain 302 of the computing device 100. As described above, each translation cache 304 stores executable translated binary code that has been produced by the binary translation process. The translated binary code may be directly executable the processor 120. Each translation cache 304 is shared by the threads 306 of the respective execution domain 302. The number of execution domains 302 (and thus, the number of translation caches 304) is configurable. The computing device 100 may allocate translation caches 304 based on the expected thread count or other expected workload of the computing device 100.

In block 408, the computing device 100 assigns one or more threads 306 to each of the execution domains 302 (and, thus, to the associated translation cache 304). Each thread 306 may be embodied as a hardware thread, software thread, logical processor, or other instance of execution context maintained by the computing device 100. The computing device 100 may assign any number of threads 306 to each execution domain 302. In some embodiments, the computing device 100 may assign a relatively small number of threads 306 or a single thread 306 to each execution domain 302, in order to reduce contention for the associated translation cache 304.

In block 410, the computing device 100 starts the binary translation process for each thread 306. For each thread 306, to perform binary translation of an original binary code at a particular instruction pointer address within the original binary code, the computing device 100 determines whether the associated T-cache 304 includes translated binary code corresponding to that instruction pointer address. If not, the computing device 100 performs a region formation operation to select a group of instructions in the original binary code to be translated and to generate translation region metadata. The computing device 100 may use the R-cache 308 as a backing store for the translation region metadata. The computing device 100 then performs a translation operation to translate the selected translation region using the translation region metadata to generate prototype code. The computing device 100 may use the P-cache 310 as a backing store for the prototype code. After the prototype code has been generated and/or located, the computing device 100 performs an installation operation to install the executable translated binary code (based on the prototype code) into the appropriate T-cache 304. The computing device 100 executes the translated binary code from the T-cache 304. After starting the binary translation process, the method 400 is completed and the computing device 100 may continue to perform the binary translation process for each thread 306. One potential embodiment of a method for binary translation that may be performed by each thread 306 of the computing device 100 is described further below in connection with FIG. 5.

Figure 5:
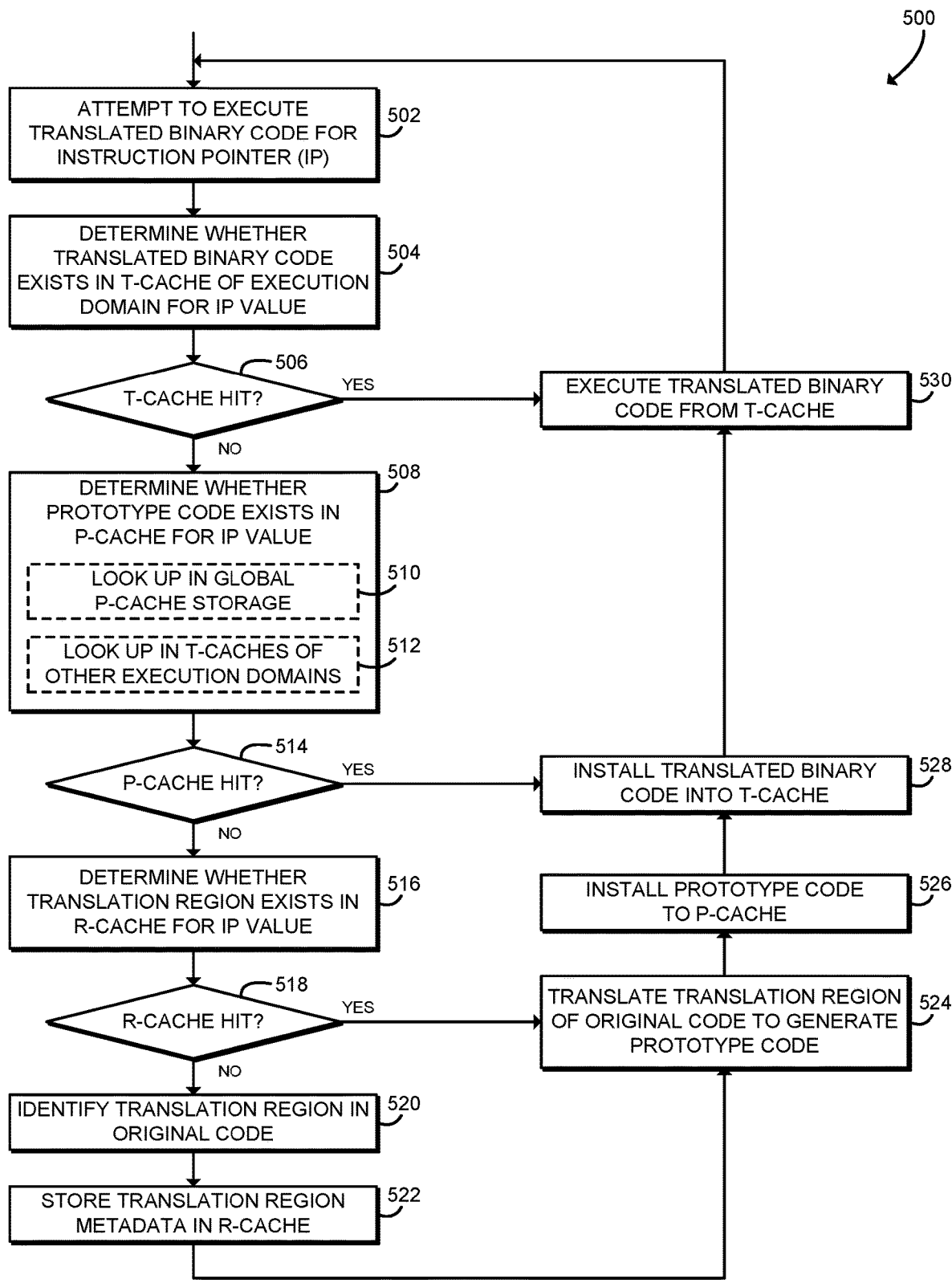
FIG. 5 is a simplified flow diagram of at least one embodiment of a method for binary translation with scalable translation caching that may be executed by the computing device of FIGS. 1-3.

Referring now to FIG. 5, in use, the computing device 100 may execute a method 500 for binary translation with scalable translation caching. As described above in connection with block 410 of FIG. 4, the method 500 may be executed by each thread 306 of the computing device 100 after the execution domains 302 have been established and after the T-caches 304, the global R-cache 308, and/or the global P-cache 310 have been allocated. The method 500 begins in block 502, in which the computing device 100 attempts to execute translated binary code for an instruction pointer (IP) address of the current thread 306 that points to a location within an original binary code. The binary code may be, for example, an executable file, an executable binary image, an executable memory region, or other binary code of a program associated with the current thread 306. The original binary code may target an instruction set architecture (ISA) that is executable by the processor 120 or an ISA that is not executable by the processor 120.

In block 504, the computing device 100 determines whether translated binary code exists in the T-cache 304 corresponding to the execution domain 302 of the current thread 306. The computing device 100 may look up the translated binary code using a search key or other index, such as the instruction pointer address of the current thread 306. As described above, the T-cache 304 is shared by the threads 306 of the execution domain 302. Therefore, the current thread 306 may obtain a lock on the T-cache 304 or otherwise access the T-cache 304 using a technique that is safe for concurrency. For example, in some embodiments, a lock may be required to update the T-cache 304 but may not be required to execute the translated binary code, using a mechanism similar to a readers-writer lock. In block 506, the computing device 100 determines whether a T-cache hit occurred. In other words, the computing device 100 determines whether the translated binary code exists in the T-cache 304. If so, the method 500 branches to block 530, described below. If a T-cache hit does not occur (i.e., if a T-cache miss occurs), the method 500 advances to block 508.

In block 508, the computing device 100 determines whether prototype code exists in the P-cache 310 for the instruction pointer address of the current thread 306. For example, the computing device 100 may use the instruction pointer address as a search key or index to search for the prototype code. The P-cache 310 is global; that is, the P-cache 310 is shared by threads 306 from multiple execution domains 302 of the computing device 100. Therefore, the current thread 306 may obtain a lock on the P-cache 310 or otherwise access the P-cache 310 using a technique that is safe for concurrency. For example, in some embodiments the computing device 100 may protect the P-cache 310 using an ordinal lock. In some embodiments, in block 510 the computing device 100 may look up the prototype code in a global memory structure of the P-cache 310. In those embodiments, the prototype code may be stored in a global memory structure such as an array, with the storage space shared by threads 306 from multiple execution domains 302. In some embodiments, in block 512 the computing device 100 may look up the prototype code in one or more T-caches 304 associated with other execution domains 302. For example, for a current thread 306*a* of an execution domain 302*a* having a T-cache 304*a*, the computing device 100 may search for prototype code in the T-cache 304*b* of another execution domain 302*b*. In those embodiments, the P-cache 310 may maintain a global data structure such as an index of T-caches 304 that may be used to search for the prototype code.

In block 514, the computing device 100 determines whether a P-cache hit occurred. In other words, the computing device 100 determines whether the prototype code exists in the P-cache 310. If so, the method 500 branches to block 528, described below. If a P-cache hit does not occur (i.e., if a P-cache miss occurs), the method 500 advances to block 516. Additionally or alternatively, as described above, in some embodiments, the computing device 100 may not establish a global P-cache 310. In those embodiments without a global P-cache 310, the method 500 may proceed to block 516.

In block 516 the computing device 100 determines whether translation region metadata exists in the R-cache 308 for the instruction pointer address of the current thread 306. For example, the computing device 100 may use the instruction pointer address as a search key or index to search for the translation region metadata. The R-cache 308 is global; that is, the R-cache 308 is shared by threads 306 from multiple execution domains 302 of the computing device 100. Therefore, the current thread 306 may obtain a lock on the R-cache 308 or otherwise access the R-cache 308 using a technique that is safe for concurrency. For example, in some embodiments, the computing device 100 may protect the R-cache 308 using an ordinal lock. In block 518, the computing device 100 determines whether an R-cache hit occurred. In other words, the computing device 100 determines whether the translation region metadata exists in the R-cache 308. If so, the method 500 branches to block 524, described below. If an R-cache hit does not occur (i.e., if an R-cache miss occurs), the method 500 advances to block 520. Additionally or alternatively, as described above, in some embodiments, the computing device 100 may not establish a global R-cache 308. In those embodiments without a global R-cache 308, the method 500 may proceed to block 520.

In block 520, the computing device 100 identifies a translation region in the original binary code. In particular, the computing device 100 may perform a region formation operation to identify the original binary code instructions and control flow paths to be translated. The region formation operation generates translation region metadata. As described above, the translation region metadata may include the control flow graph of the original binary code, the original instruction data of the original binary code, and/or other metadata that may be used by the binary translation process. In block 522, the computing device 100 stores the translation region metadata in the R-cache 308. As described above, the R-cache 308 is global. Therefore, the current thread 306 may obtain a lock on the R-cache 308 or otherwise access the R-cache 308 using a technique that is safe for concurrency. The stored translation region metadata may be associated with the instruction pointer address of the current thread 306, which may allow the translation region metadata to be reused for future translations. Thus, caching the translation region metadata may improve performance by allowing the computing device 100 to skip the region formation operation for future translations. The computing device 100 may also use the cached translation region metadata to enable retranslation (e.g., with more aggressive optimizations), consistency checks, or other operations. Additionally, because the R-cache 308 is shared by all of the execution domains 302, the overall demand for memory by the binary translation process may be reduced.

After storing the generated region translation as described above in connection with block 522 or after an R-cache hit as described above in connection with block 518, the method 500 branches to block 524. In block 524, the computing device 100 translates the identified translation region of the original binary code to generate the prototype code. The computing device 100 may use the translation region metadata to perform the translation operation, including using the original binary code instructions and/or the control flow graph. The generated prototype code may be embodied as a primitive or non-executable version of the translated binary code. For example, address mapping and specific opcode assignments of the prototype code may not be finalized. As another example, the prototype code may be embodied as binary code that targets an instruction set architecture (ISA) of the processor 120 and has not yet been linked, relocated, or otherwise bound to a particular address range. In block 526, the computing device 100 installs the prototype code into the P-cache 310. As described above, the P-cache 310 is global. Therefore, the current thread 306 may obtain a lock on the P-cache 310 or otherwise access the P-cache 310 using a technique that is safe for concurrency. The installed prototype code may be associated with the instruction pointer address of the current thread 306, which may allow the prototype code to be reused for future translations. Thus, caching the prototype code may improve performance by allowing the computing device 100 to skip the translation operation for future translations. Additionally, because the P-cache 310 is shared by all of the execution domains 302, the overall demand for memory by the binary translation process may be reduced.

After installing the generated prototype code as described above in connection with block 526 or after a P-cache hit as described above in connection with block 514, the method 500 branches to block 528. In block 528, the computing device 100 installs the translated binary code based on the prototype code from the P-cache 310 into the T-cache 304 of the execution domain 302 associated with the current thread 306. For example, the computing device 100 may copy the prototype code from the P-cache 310 into the appropriate T-cache 304. The computing device 100 may copy the prototype code from a global data structure of the P-cache 310 or, in some embodiments, from the T-cache 304 of another execution domain 302. In some embodiments, the computing device 100 may modify the prototype code as it is being installed in order to render the translated binary code executable, for example by performing relocation or other address binding on the prototype code. As described above, the T-cache 304 is shared by all threads 306 of the current execution domain 302. Therefore, the current thread 306 may obtain a lock on the T-cache 304 or otherwise access the T-cache 304 using a technique that is safe for concurrency.

After installing the translated binary code as described above in connection with block 528 or after a T-cache hit as described above in connection with block 506, the method 500 branches to block 530. In block 530, the computing device 100 executes the translated binary code from the T-cache 304 of the execution domain 302 that is associated with the current thread 306. For example, the processor 120 may execute instructions from the translated binary code. Executing the instructions may advance or otherwise modify the instruction pointer address of the current thread 306. After executing the translated binary code, the method 500 loops back to block 502 to continue the binary translation process.

It should be appreciated that, in some embodiments, the methods 400 and/or 500 may be embodied as various instructions stored on a computer-readable media, which may be executed by the processor 120, the I/O subsystem 122, and/or other components of the computing device 100 to cause the computing device 100 to perform the respective method 400 and/or 500. The computer-readable media may be embodied as any type of media capable of being read by the computing device 100 including, but not limited to, the memory 124, the data storage device 126, microcode of the processor 120, firmware devices, other memory or data storage devices of the computing device 100, portable media readable by a peripheral device of the computing device 100, and/or other media.

EXAMPLES

Illustrative examples of the technologies disclosed herein are provided below. An embodiment of the technologies may include any one or more, and any combination of, the examples described below.

Example 1 includes a computing device for binary translation, the computing device comprising: a translation cache module to allocate a first translation cache, wherein the first translation cache is shared by all threads associated with a first execution domain of the computing device; and a binary translation module to (i) assign a first thread to the first execution domain, (ii) translate a first binary code of a program associated with the first thread to generate a first translated binary code, and (iii) install the first translated binary code into the first translation cache for execution.

Example 2 includes the subject matter of Example 1, and wherein the binary translation module is further to execute the first translated binary code in response to installation of the first translated binary code into the first translation cache.

Example 3 includes the subject matter of any of Examples 1 and 2, and wherein the first binary code targets a first instruction set architecture and the first translated binary code targets a second instruction set architecture.

Example 4 includes the subject matter of any of Examples 1-3, and wherein the binary translation module is further execute, by a processor of the computing device, the first translated binary code in response to installation of the first translated binary code into the first translation cache, wherein the processor supports the second instruction set architecture.

Example 5 includes the subject matter of any of Examples 1-4, and wherein the first thread comprises a hardware thread executed by a logical processor of the computing device.

Example 6 includes the subject matter of any of Examples 1-5, and wherein the first thread comprises a software thread.

Example 7 includes the subject matter of any of Examples 1-6, and wherein: the translation cache module is further to determine whether the first translated binary code exists in the first translation cache, wherein the first translated binary code is associated with an instruction pointer address of the first thread, and wherein the instruction pointer address refers to a location within the first binary code of the program associated with the first thread; and to translate the first binary code of the program associated with the first thread to generate the first translated binary code comprises to translate the first binary code of the program associated with the first thread to generate the first translated binary code in response to a determination that the first translated binary code does not exist in the first translation cache.

Example 8 includes the subject matter of any of Examples 1-7, and further comprising a region cache module to: allocate a global region cache, wherein the global region cache is shared by threads associated with any execution domain of the computing device; generate a first translation region metadata associated with the first binary code of the program associated with the first thread; and store the first translation region metadata associated with the first binary code of the program associated with the first thread in the global region cache in response to generation of the first translation region metadata; wherein to translate the first binary code of the program associated with the first thread to generate the first translated binary code comprises to translate the first binary code of the program associated with the first thread with the first translation region metadata to generate the first translated binary code.

Example 9 includes the subject matter of any of Examples 1-8, and wherein: the region cache module is further to determine whether the first translation region metadata associated with the first binary code of the program associated with the first thread exists in the global region cache; and to generate the first translation region metadata associated with the first binary code of the program associated with the first thread comprises to generate the first translation region metadata in response to a determination that the first translation region metadata does not exist in the global region cache.

Example 10 includes the subject matter of any of Examples 1-9, and further comprising a prototype cache module to: allocate a global prototype cache, wherein the global prototype cache is shared by threads associated with any execution domain of the computing device; and install a first prototype code associated with the first binary code of the program associated with the first thread into the global prototype cache in response to translation of the first binary code of the program associated with the first thread to generate the first translated binary code; wherein to translate the first binary code of the program associated with the first thread comprises to translate the first binary code of the program associated with the first thread to generate the first prototype code, wherein the first prototype code comprises a non-executable version of the first translated binary code; and wherein to install the first translated binary code into the first translation cache for execution comprises to install the first translated binary code, based on the first prototype code, into the first translation cache in response to installation of the first prototype code into the global prototype cache.

Example 11 includes the subject matter of any of Examples 1-10, and wherein: the prototype cache module is further to determine whether the first prototype code associated with the first binary code of the program associated with the first thread exists in the global prototype cache; and to translate the first binary code of the program associated with the first thread further comprises to translate the first binary code of the program associated with the first thread to generate the first prototype code in response to a determination that the first prototype code does not exist in the global prototype cache.

Example 12 includes the subject matter of any of Examples 1-11, and wherein to determine whether the first prototype code associated with the first binary code of the program associated with the first thread exists in the global prototype cache comprises to determine whether the first prototype code exists in a global storage area of the global prototype cache.

Example 13 includes the subject matter of any of Examples 1-12, and wherein to determine whether the first prototype code associated with the first binary code of the program associated with the first thread exists in the global prototype cache comprises to determine whether the first prototype code exists in a second translation cache, wherein the second translation cache is shared by all threads associated with a second execution domain.

Example 14 includes the subject matter of any of Examples 1-13, and further comprising: a region cache module to (i) allocate a global region cache, wherein the global region cache is shared by threads associated with any execution domain of the computing device, (ii) generate a first translation region metadata associated with the first binary code of the program associated with the first thread, and (iii) store the first translation region metadata associated with the first binary code of the program associated with the first thread in the global region cache in response to generation of the first translation region metadata; and a prototype cache module to (i) allocate a global prototype cache, wherein the global prototype cache is shared by threads associated with any execution domain of the computing device and (ii) install a first prototype code associated with the first binary code of the program associated with the first thread into the global prototype cache in response to translation of the first binary code of the program associated with the first thread to generate the first translated binary code; wherein to translate the first binary code of the program associated with the first thread comprises to translate the first binary code of the program associated with the first thread with the first translated region metadata to generate the first prototype code, wherein the first prototype code comprises a non-executable version of the first translated binary code; and wherein to install the first translated binary code into the first translation cache for execution comprises to install the first translated binary code, based on the first prototype code, into the first translation cache in response to installation of the first prototype code into the global prototype cache.

Example 15 includes the subject matter of any of Examples 1-14, and wherein: the prototype cache module is further to determine whether the first prototype code associated with the instruction pointer address of the first thread exists in the global prototype cache; to region cache module is further to determine whether the first translation region metadata associated with the first binary code of the program associated with the first thread exists in the global region cache in response to a determination that the first prototype code does not exist in the global prototype cache; to generate the first translation region metadata associated with the first binary code of the program associated with the first thread comprises to generate the first translation region metadata in response to a determination that the first translation region metadata does not exist in the global region cache; and to translate the first binary code of the program associated with the first thread with the first translated region metadata to generate the first prototype code comprises to translate the first binary code in response to storage of the first translation region metadata in the global region cache or in response to a determination that the first translation region metadata exists in the global region cache.

Example 16 includes the subject matter of any of Examples 1-15, and wherein the binary translation module is further to (i) assign a second thread to the first execution domain, (ii) translate a second binary code of a program associated with the second thread to generate a second translated binary code, and (iii) install the second translated binary code into the first translation cache for execution.

Example 17 includes the subject matter of any of Examples 1-16, and wherein: the translation cache module is further to allocate a second translation cache, wherein the second translation cache is shared by all threads associated with a second execution domain of the computing device; and the binary translation module is further to (i) assign a second thread to the second execution domain, (ii) translate a second binary code of a program associated with the second thread to generate a second translated binary code, and (iii) install the second translated binary code into the second translation cache for execution.

Example 18 includes the subject matter of any of Examples 1-17, and wherein the binary translation module is further to (i) assign a third thread to the first execution domain, (ii) translate a third binary code of a program associated with the third thread to generate a third translated binary code, and (iii) install the third translated binary code into the first translation cache for execution.

Example 19 includes the subject matter of any of Examples 1-18, and further comprising a region cache module to: allocate a global region cache, wherein the global region cache is shared by threads associated with any execution domain of the computing device; generate a first translation region metadata associated with the first binary code of the program associated with the first thread; store the first translation region metadata associated with the first binary code of the program associated with the first thread in the global region cache in response to generation of the first translation region metadata; generate a second translation region metadata associated with the second binary code of the program associated with the second thread; and store the second translation region metadata associated with the second binary code of the program associated with the second thread in the global region cache in response to generation of the second translation region metadata; wherein to translate the first binary code of the program associated with the first thread to generate the first translated binary code comprises to translate the first binary code of the program associated with the first thread with the first translation region metadata to generate the first translated binary code; and wherein to translate the second binary code of the program associated with the second thread to generate the second translated binary code comprises to translate the second binary code of the program associated with the second thread with the second translation region metadata to generate the second translated binary code.

Example 20 includes the subject matter of any of Examples 1-19, and further comprising a prototype cache module to: allocate a global prototype cache, wherein the global prototype cache is shared by threads associated with any execution domain of the computing device; install a first prototype code associated with the first binary code of the program associated with the first thread into the global prototype cache in response to translation of the first binary code of the program associated with the first thread to generate the first translated binary code; and install a second prototype code associated with the second binary code of the program associated with the second thread into the global prototype cache in response to translation of the second binary code of the program associated with the second thread to generate the second translated binary code; wherein to translate the first binary code of the program associated with the first thread comprises to translate the first binary code of the program associated with the first thread to generate the first prototype code, wherein the first prototype code comprises a non-executable version of the first translated binary code; wherein to translate the second binary code of the program associated with the second thread comprises to translate the second binary code of the program associated with the second thread to generate the second prototype code, wherein the second prototype code comprises a non-executable version of the second translated binary code; wherein to install the first translated binary code into the first translation cache for execution comprises to install the first translated binary code, based on the first prototype code, into the first translation cache in response to installation of the first prototype code into the global prototype cache; and wherein to install the second translated binary code into the second translation cache for execution comprises to install the second translated binary code, based on the second prototype code, into the second translation cache in response to installation of the second prototype code into the global prototype cache.

Example 21 includes a method for binary translation, the method comprising: allocating, by a computing device, a first translation cache, wherein the first translation cache is shared by all threads associated with a first execution domain of the computing device; assigning, by the computing device, a first thread to the first execution domain; translating, by the computing device, a first binary code of a program associated with the first thread to generate a first translated binary code; and installing, by the computing device, the first translated binary code into the first translation cache for execution.

Example 22 includes the subject matter of Example 21, and further comprising executing, by the computing device, the first translated binary code in response to installing the first translated binary code into the first translation cache.

Example 23 includes the subject matter of any of Examples 21 and 22, and wherein the first binary code targets a first instruction set architecture and the first translated binary code targets a second instruction set architecture.

Example 24 includes the subject matter of any of Examples 21-23, and further comprising executing, by a processor of the computing device, the first translated binary code in response to installing the first translated binary code into the first translation cache, wherein the processor supports the second instruction set architecture.

Example 25 includes the subject matter of any of Examples 21-24, and wherein the first thread comprises a hardware thread executed by a logical processor of the computing device.

Example 26 includes the subject matter of any of Examples 21-25, and wherein the first thread comprises a software thread.

Example 27 includes the subject matter of any of Examples 21-26, and further comprising: determining, by the computing device, whether the first translated binary code exists in the first translation cache, wherein the first translated binary code is associated with an instruction pointer address of the first thread, and wherein the instruction pointer address refers to a location within the first binary code of the program associated with the first thread; wherein translating the first binary code of the program associated with the first thread to generate the first translated binary code comprises translating the first binary code of the program associated with the first thread to generate the first translated binary code in response to determining that the first translated binary code does not exist in the first translation cache.

Example 28 includes the subject matter of any of Examples 21-27, and further comprising: allocating, by the computing device, a global region cache, wherein the global region cache is shared by threads associated with any execution domain of the computing device; generating, by the computing device, a first translation region metadata associated with the first binary code of the program associated with the first thread; and storing, by the computing device, the first translation region metadata associated with the first binary code of the program associated with the first thread in the global region cache in response to generating the first translation region metadata; wherein translating the first binary code of the program associated with the first thread to generate the first translated binary code comprises translating the first binary code of the program associated with the first thread using the first translation region metadata to generate the first translated binary code.

Example 29 includes the subject matter of any of Examples 21-28, and further comprising: determining, by the computing device, whether the first translation region metadata associated with the first binary code of the program associated with the first thread exists in the global region cache; wherein generating the first translation region metadata associated with the first binary code of the program associated with the first thread comprises generating the first translation region metadata in response to determining that the first translation region metadata does not exist in the global region cache.

Example 30 includes the subject matter of any of Examples 21-29, and further comprising: allocating, by the computing device, a global prototype cache, wherein the global prototype cache is shared by threads associated with any execution domain of the computing device; and installing, by the computing device, a first prototype code associated with the first binary code of the program associated with the first thread into the global prototype cache in response to translating the first binary code of the program associated with the first thread to generate the first translated binary code; wherein translating the first binary code of the program associated with the first thread comprises translating the first binary code of the program associated with the first thread to generate the first prototype code, wherein the first prototype code comprises a non-executable version of the first translated binary code; and wherein installing the first translated binary code into the first translation cache for execution comprises installing the first translated binary code, based on the first prototype code, into the first translation cache in response to installing the first prototype code into the global prototype cache.

Example 31 includes the subject matter of any of Examples 21-30, and further comprising: determining, by the computing device, whether the first prototype code associated with the first binary code of the program associated with the first thread exists in the global prototype cache; and wherein translating the first binary code of the program associated with the first thread further comprises translating the first binary code of the program associated with the first thread to generate the first prototype code in response to determining that the first prototype code does not exist in the global prototype cache.

Example 32 includes the subject matter of any of Examples 21-31, and wherein determining whether the first prototype code associated with the first binary code of the program associated with the first thread exists in the global prototype cache comprises determining whether the first prototype code exists in a global storage area of the global prototype cache.

Example 33 includes the subject matter of any of Examples 21-32, and wherein determining whether the first prototype code associated with the first binary code of the program associated with the first thread exists in the global prototype cache comprises determining whether the first prototype code exists in a second translation cache, wherein the second translation cache is shared by all threads associated with a second execution domain.

Example 34 includes the subject matter of any of Examples 21-33, and further comprising: allocating, by the computing device, a global region cache, wherein the global region cache is shared by threads associated with any execution domain of the computing device; allocating, by the computing device, a global prototype cache, wherein the global prototype cache is shared by threads associated with any execution domain of the computing device; generating, by the computing device, a first translation region metadata associated with the first binary code of the program associated with the first thread; storing, by the computing device, the first translation region metadata associated with the first binary code of the program associated with the first thread in the global region cache in response to generating the first translation region metadata; and installing, by the computing device, a first prototype code associated with the first binary code of the program associated with the first thread into the global prototype cache in response to translating the first binary code of the program associated with the first thread to generate the first translated binary code; wherein translating the first binary code of the program associated with the first thread comprises translating the first binary code of the program associated with the first thread using the first translated region metadata to generate the first prototype code, wherein the first prototype code comprises a non-executable version of the first translated binary code; and wherein installing the first translated binary code into the first translation cache for execution comprises installing the first translated binary code, based on the first prototype code, into the first translation cache in response to installing the first prototype code into the global prototype cache.

Example 35 includes the subject matter of any of Examples 21-34, and further comprising: determining, by the computing device, whether the first prototype code associated with the instruction pointer address of the first thread exists in the global prototype cache; and determining, by the computing device, whether the first translation region metadata associated with the first binary code of the program associated with the first thread exists in the global region cache in response to determining that the first prototype code does not exist in the global prototype cache; wherein generating the first translation region metadata associated with the first binary code of the program associated with the first thread comprises generating the first translation region metadata in response to determining that the first translation region metadata does not exist in the global region cache; and wherein translating the first binary code of the program associated with the first thread using the first translated region metadata to generate the first prototype code comprises translating the first binary code in response to storing the first translation region metadata in the global region cache or in response to determining that the first translation region metadata exists in the global region cache.

Example 36 includes the subject matter of any of Examples 21-35, and further comprising: assigning, by the computing device, a second thread to the first execution domain; translating, by the computing device, a second binary code of a program associated with the second thread to generate a second translated binary code; and installing, by the computing device, the second translated binary code into the first translation cache for execution.

Example 37 includes the subject matter of any of Examples 21-36, and further comprising: allocating, by the computing device, a second translation cache, wherein the second translation cache is shared by all threads associated with a second execution domain of the computing device; assigning, by the computing device, a second thread to the second execution domain; translating, by the computing device, a second binary code of the program associated with the second thread to generate a second translated binary code; and installing, by the computing device, the second translated binary code into the second translation cache for execution.

Example 38 includes the subject matter of any of Examples 21-37, and further comprising: assigning, by the computing device, a third thread to the first execution domain; translating, by the computing device, a third binary code of a program associated with the third thread to generate a third translated binary code; and installing, by the computing device, the third translated binary code into the first translation cache for execution.

Example 39 includes the subject matter of any of Examples 21-38, and further comprising: allocating, by the computing device, a global region cache, wherein the global region cache is shared by threads associated with any execution domain of the computing device; generating, by the computing device, a first translation region metadata associated with the first binary code of the program associated with the first thread; storing, by the computing device, the first translation region metadata associated with the first binary code of the program associated with the first thread in the global region cache in response to generating the first translation region metadata; generating, by the computing device, a second translation region metadata associated with the second binary code of the program associated with the second thread; and storing, by the computing device, the second translation region metadata associated with the second binary code of the program associated with the second thread in the global region cache in response to generating the second translation region metadata; wherein translating the first binary code of the program associated with the first thread to generate the first translated binary code comprises translating the first binary code of the program associated with the first thread using the first translation region metadata to generate the first translated binary code; and wherein translating the second binary code of the program associated with the second thread to generate the second translated binary code comprises translating the second binary code of the program associated with the second thread using the second translation region metadata to generate the second translated binary code.

Example 40 includes the subject matter of any of Examples 21-39, and further comprising: allocating, by the computing device, a global prototype cache, wherein the global prototype cache is shared by threads associated with any execution domain of the computing device; installing, by the computing device, a first prototype code associated with the first binary code of the program associated with the first thread into the global prototype cache in response to translating the first binary code of the program associated with the first thread to generate the first translated binary code; and installing, by the computing device, a second prototype code associated with the second binary code of the program associated with the second thread into the global prototype cache in response to translating the second binary code of the program associated with the second thread to generate the second translated binary code; wherein translating the first binary code of the program associated with the first thread comprises translating the first binary code of the program associated with the first thread to generate the first prototype code, wherein the first prototype code comprises a non-executable version of the first translated binary code; wherein translating the second binary code of the program associated with the second thread comprises translating the second binary code of the program associated with the second thread to generate the second prototype code, wherein the second prototype code comprises a non-executable version of the second translated binary code; wherein installing the first translated binary code into the first translation cache for execution comprises installing the first translated binary code, based on the first prototype code, into the first translation cache in response to installing the first prototype code into the global prototype cache; and wherein installing the second translated binary code into the second translation cache for execution comprises installing the second translated binary code, based on the second prototype code, into the second translation cache in response to installing the second prototype code into the global prototype cache.

Example 41 includes a computing device comprising: a processor; and a memory having stored therein a plurality of instructions that when executed by the processor cause the computing device to perform the method of any of Examples 21-40.

Example 42 includes one or more machine readable storage media comprising a plurality of instructions stored thereon that in response to being executed result in a computing device performing the method of any of Examples 21-40.

Example 43 includes a computing device comprising means for performing the method of any of Examples 21-40.

Example 44 includes a computing device for binary translation, the computing device comprising: means for allocating a first translation cache, wherein the first translation cache is shared by all threads associated with a first execution domain of the computing device; means for assigning a first thread to the first execution domain; means for translating a first binary code of a program associated with the first thread to generate a first translated binary code; and means for installing the first translated binary code into the first translation cache for execution.

Example 45 includes the subject matter of Example 44, and further comprising means for executing the first translated binary code in response to installing the first translated binary code into the first translation cache.

Example 46 includes the subject matter of any of Examples 44 and 45, and wherein the first binary code targets a first instruction set architecture and the first translated binary code targets a second instruction set architecture.

Example 47 includes the subject matter of any of Examples 44-46, and further comprising means for executing, by a processor of the computing device, the first translated binary code in response to installing the first translated binary code into the first translation cache, wherein the processor supports the second instruction set architecture.

Example 48 includes the subject matter of any of Examples 44-47, and wherein the first thread comprises a hardware thread executed by a logical processor of the computing device.

Example 49 includes the subject matter of any of Examples 44-48, and wherein the first thread comprises a software thread.

Example 50 includes the subject matter of any of Examples 44-49, and further comprising: means for determining whether the first translated binary code exists in the first translation cache, wherein the first translated binary code is associated with an instruction pointer address of the first thread, and wherein the instruction pointer address refers to a location within the first binary code of the program associated with the first thread; wherein the means for translating the first binary code of the program associated with the first thread to generate the first translated binary code comprises means for translating the first binary code of the program associated with the first thread to generate the first translated binary code in response to determining that the first translated binary code does not exist in the first translation cache.

Example 51 includes the subject matter of any of Examples 44-50, and further comprising: means for allocating a global region cache, wherein the global region cache is shared by threads associated with any execution domain of the computing device; means for generating a first translation region metadata associated with the first binary code of the program associated with the first thread; and means for storing the first translation region metadata associated with the first binary code of the program associated with the first thread in the global region cache in response to generating the first translation region metadata; wherein the means for translating the first binary code of the program associated with the first thread to generate the first translated binary code comprises means for translating the first binary code of the program associated with the first thread using the first translation region metadata to generate the first translated binary code.

Example 52 includes the subject matter of any of Examples 44-51, and further comprising: means for determining whether the first translation region metadata associated with the first binary code of the program associated with the first thread exists in the global region cache; wherein the means for generating the first translation region metadata associated with the first binary code of the program associated with the first thread comprises means for generating the first translation region metadata in response to determining that the first translation region metadata does not exist in the global region cache.

Example 53 includes the subject matter of any of Examples 44-52, and further comprising: means for allocating a global prototype cache, wherein the global prototype cache is shared by threads associated with any execution domain of the computing device; and means for installing a first prototype code associated with the first binary code of the program associated with the first thread into the global prototype cache in response to translating the first binary code of the program associated with the first thread to generate the first translated binary code; wherein the means for translating the first binary code of the program associated with the first thread comprises means for translating the first binary code of the program associated with the first thread to generate the first prototype code, wherein the first prototype code comprises a non-executable version of the first translated binary code; and wherein the means for installing the first translated binary code into the first translation cache for execution comprises means for installing the first translated binary code, based on the first prototype code, into the first translation cache in response to installing the first prototype code into the global prototype cache.

Example 54 includes the subject matter of any of Examples 44-53, and further comprising: means for determining whether the first prototype code associated with the first binary code of the program associated with the first thread exists in the global prototype cache; and wherein the means for translating the first binary code of the program associated with the first thread further comprises means for translating the first binary code of the program associated with the first thread to generate the first prototype code in response to determining that the first prototype code does not exist in the global prototype cache.

Example 55 includes the subject matter of any of Examples 44-54, and wherein the means for determining whether the first prototype code associated with the first binary code of the program associated with the first thread exists in the global prototype cache comprises means for determining whether the first prototype code exists in a global storage area of the global prototype cache.

Example 56 includes the subject matter of any of Examples 44-55, and wherein the means for determining whether the first prototype code associated with the first binary code of the program associated with the first thread exists in the global prototype cache comprises means for determining whether the first prototype code exists in a second translation cache, wherein the second translation cache is shared by all threads associated with a second execution domain.

Example 57 includes the subject matter of any of Examples 44-56, and further comprising: means for allocating a global region cache, wherein the global region cache is shared by threads associated with any execution domain of the computing device; means for allocating a global prototype cache, wherein the global prototype cache is shared by threads associated with any execution domain of the computing device; means for generating a first translation region metadata associated with the first binary code of the program associated with the first thread; means for storing the first translation region metadata associated with the first binary code of the program associated with the first thread in the global region cache in response to generating the first translation region metadata; and means for installing a first prototype code associated with the first binary code of the program associated with the first thread into the global prototype cache in response to translating the first binary code of the program associated with the first thread to generate the first translated binary code; wherein the means for translating the first binary code of the program associated with the first thread comprises means for translating the first binary code of the program associated with the first thread using the first translated region metadata to generate the first prototype code, wherein the first prototype code comprises a non-executable version of the first translated binary code; and wherein the means for installing the first translated binary code into the first translation cache for execution comprises means for installing the first translated binary code, based on the first prototype code, into the first translation cache in response to installing the first prototype code into the global prototype cache.

Example 58 includes the subject matter of any of Examples 44-57, and further comprising: means for determining whether the first prototype code associated with the instruction pointer address of the first thread exists in the global prototype cache; and means for determining whether the first translation region metadata associated with the first binary code of the program associated with the first thread exists in the global region cache in response to determining that the first prototype code does not exist in the global prototype cache; wherein the means for generating the first translation region metadata associated with the first binary code of the program associated with the first thread comprises means for generating the first translation region metadata in response to determining that the first translation region metadata does not exist in the global region cache; and wherein the means for translating the first binary code of the program associated with the first thread using the first translated region metadata to generate the first prototype code comprises means for translating the first binary code in response to storing the first translation region metadata in the global region cache or in response to determining that the first translation region metadata exists in the global region cache.

Example 59 includes the subject matter of any of Examples 44-58, and further comprising: means for assigning a second thread to the first execution domain; means for translating a second binary code of a program associated with the second thread to generate a second translated binary code; and means for installing the second translated binary code into the first translation cache for execution.

Example 60 includes the subject matter of any of Examples 44-59, and further comprising: means for allocating a second translation cache, wherein the second translation cache is shared by all threads associated with a second execution domain of the computing device; means for assigning a second thread to the second execution domain; means for translating a second binary code of the program associated with the second thread to generate a second translated binary code; and means for installing the second translated binary code into the second translation cache for execution.

Example 61 includes the subject matter of any of Examples 44-60, and further comprising: means for assigning a third thread to the first execution domain; means for translating a third binary code of a program associated with the third thread to generate a third translated binary code; and means for installing the third translated binary code into the first translation cache for execution.

Example 62 includes the subject matter of any of Examples 44-61, and further comprising: means for allocating a global region cache, wherein the global region cache is shared by threads associated with any execution domain of the computing device; means for generating a first translation region metadata associated with the first binary code of the program associated with the first thread; means for storing the first translation region metadata associated with the first binary code of the program associated with the first thread in the global region cache in response to generating the first translation region metadata; means for generating a second translation region metadata associated with the second binary code of the program associated with the second thread; and means for storing the second translation region metadata associated with the second binary code of the program associated with the second thread in the global region cache in response to generating the second translation region metadata; wherein the means for translating the first binary code of the program associated with the first thread to generate the first translated binary code comprises means for translating the first binary code of the program associated with the first thread using the first translation region metadata to generate the first translated binary code; and wherein the means for translating the second binary code of the program associated with the second thread to generate the second translated binary code comprises means for translating the second binary code of the program associated with the second thread using the second translation region metadata to generate the second translated binary code.

Example 63 includes the subject matter of any of Examples 44-62, and further comprising: means for allocating a global prototype cache, wherein the global prototype cache is shared by threads associated with any execution domain of the computing device; means for installing a first prototype code associated with the first binary code of the program associated with the first thread into the global prototype cache in response to translating the first binary code of the program associated with the first thread to generate the first translated binary code; and means for installing a second prototype code associated with the second binary code of the program associated with the second thread into the global prototype cache in response to translating the second binary code of the program associated with the second thread to generate the second translated binary code; wherein the means for translating the first binary code of the program associated with the first thread comprises means for translating the first binary code of the program associated with the first thread to generate the first prototype code, wherein the first prototype code comprises a non-executable version of the first translated binary code; wherein the means for translating the second binary code of the program associated with the second thread comprises means for translating the second binary code of the program associated with the second thread to generate the second prototype code, wherein the second prototype code comprises a non-executable version of the second translated binary code; wherein the means for installing the first translated binary code into the first translation cache for execution comprises means for installing the first translated binary code, based on the first prototype code, into the first translation cache in response to installing the first prototype code into the global prototype cache; and wherein the means for installing the second translated binary code into the second translation cache for execution comprises means for installing the second translated binary code, based on the second prototype code, into the second translation cache in response to installing the second prototype code into the global prototype cache.

The invention claimed is:

1. A computing device for binary translation, the computing device comprising:
   a translation cache module to allocate a first translation cache, wherein the first translation cache is shared by all threads associated with a first execution domain of the computing device, wherein each of the threads associated with the first execution domain comprises an instance of execution context maintained by the computing device;
   a region cache module to (i) allocate a global region cache in a memory of the computing device, (ii) generate a first translation region metadata associated with a first binary code of a program associated with a first thread, wherein the first translation region metadata comprises control flow data of the first binary code, and (iii) store the first translation region metadata associated with the first binary code of the program associated with the first thread in the global region cache;
   a prototype cache module to (i) allocate a global prototype cache, wherein the global prototype cache is shared by threads associated with any execution domain of the computing device and (ii) install a first prototype code associated with the first binary code of the program associated with the first thread into the global prototype cache in response to translation of the first binary code of the program associated with the first thread to generate the first prototype code; and
   a binary translation module to (i) assign the first thread to the first execution domain, (ii) translate, by the first thread, the first binary code of the program associated with the first thread with the first translation region metadata to generate the first prototype code, and (iii) install, by the first thread, a first translated binary code, based on the first prototype code, into the first translation cache for execution by the first thread in response to installation of the first prototype code into the global prototype cache, wherein the first prototype code comprises a non-executable version of the first translated binary code.

2. The computing device of claim 1, wherein the first binary code targets a first instruction set architecture and the first translated binary code targets a second instruction set architecture.

3. The computing device of claim 1, wherein the global region cache is shared by threads associated with any execution domain of the computing device.

4. The computing device of claim 1, wherein:
   the translation cache module is further to allocate a second translation cache, wherein the second translation cache is shared by all threads associated with a second execution domain of the computing device; and
   the binary translation module is further to (i) assign a second thread to the second execution domain, (ii) translate a second binary code of a program associated with the second thread to generate a second translated binary code, and (iii) install the second translated binary code into the second translation cache for execution.

5. The computing device of claim 4, wherein the binary translation module is further to (i) assign a third thread to the first execution domain, (ii) translate a third binary code of a program associated with the third thread to generate a third translated binary code, and (iii) install the third translated binary code into the first translation cache for execution.

6. The computing device of claim 4, wherein the region cache module is further to:
   generate a second translation region metadata associated with the second binary code of the program associated with the second thread; and
   store the second translation region metadata associated with the second binary code of the program associated with the second thread in the global region cache in response to generation of the second translation region metadata;
   wherein to translate the second binary code of the program associated with the second thread to generate the second translated binary code comprises to translate the second binary code of the program associated with the second thread with the second translation region metadata to generate the second translated binary code.

7. The computing device of claim 4, wherein the prototype cache module is further to:
   install a second prototype code associated with the second binary code of the program associated with the second thread into the global prototype cache in response to translation of the second binary code of the program associated with the second thread to generate the second translated binary code;
   wherein to translate the second binary code of the program associated with the second thread comprises to translate the second binary code of the program associated with the second thread to generate the second prototype code, wherein the second prototype code comprises a non-executable version of the second translated binary code;
   and
   wherein to install the second translated binary code into the second translation cache for execution comprises to install the second translated binary code, based on the second prototype code, into the second translation cache in response to installation of the second prototype code into the global prototype cache.

8. A method for binary translation, the method comprising:
allocating, by a computing device, a first translation cache, wherein the first translation cache is shared by all threads associated with a first execution domain of the computing device, wherein each of the threads associated with the first execution domain comprises an instance of execution context maintained by the computing device;
allocating, by the computing device, a global region cache in a memory of the computing device;
allocating, by the computing device, a global prototype cache, wherein the global prototype cache is shared by threads associated with any execution domain of the computing device;
assigning, by the computing device, a first thread to the first execution domain;
generating, by the computing device, a first translation region metadata associated with a first binary code of a program associated with the first thread, wherein the first translation region metadata comprises control flow data of the first binary code;
storing, by the computing device, the first translation region metadata associated with the first binary code of the program associated with the first thread in the global region cache;
translating, by the first thread of the computing device, the first binary code of the program associated with the first thread using the first translation region metadata to generate a first prototype code;
installing, by the computing device, the first prototype code associated with the first binary code of the program associated with the first thread into the global prototype cache in response to translating the first binary code of the program associated with the first thread to generate the first prototype code; and
installing, by the first thread of the computing device, a first translated binary code, based on the first prototype code, into the first translation cache for execution by the first thread in response to installing the first prototype code into the global prototype cache, wherein the first prototype code comprises a non-executable version of the first translated binary code.

9. The method of claim 8,
wherein the global region cache is shared by threads associated with any execution domain of the computing device.

10. The method of claim 8, further comprising:
allocating, by the computing device, a second translation cache, wherein the second translation cache is shared by all threads associated with a second execution domain of the computing device;
assigning, by the computing device, a second thread to the second execution domain;
translating, by the computing device, a second binary code of the program associated with the second thread to generate a second translated binary code; and
installing, by the computing device, the second translated binary code into the second translation cache for execution.

11. The method of claim 10, further comprising:
generating, by the computing device, a second translation region metadata associated with the second binary code of the program associated with the second thread; and
storing, by the computing device, the second translation region metadata associated with the second binary code of the program associated with the second thread in the global region cache in response to generating the second translation region metadata;
wherein translating the second binary code of the program associated with the second thread to generate the second translated binary code comprises translating the second binary code of the program associated with the second thread using the second translation region metadata to generate the second translated binary code.

12. The method of claim 10, further comprising:
installing, by the computing device, a second prototype code associated with the second binary code of the program associated with the second thread into the global prototype cache in response to translating the second binary code of the program associated with the second thread to generate the second translated binary code;
wherein translating the second binary code of the program associated with the second thread comprises translating the second binary code of the program associated with the second thread to generate the second prototype code, wherein the second prototype code comprises a non-executable version of the second translated binary code;
and
wherein installing the second translated binary code into the second translation cache for execution comprises installing the second translated binary code, based on the second prototype code, into the second translation cache in response to installing the second prototype code into the global prototype cache.

13. One or more non-transitory, computer-readable storage media comprising a plurality of instructions that in response to being executed cause a computing device to:
allocate a first translation cache, wherein the first translation cache is shared by all threads associated with a first execution domain of the computing device, wherein each of the threads associated with the first execution domain comprises an instance of execution context maintained by the computing device;
allocate a global region cache in a memory of the computing device;
allocate a global prototype cache, wherein the global prototype cache is shared by threads associated with any execution domain of the computing device;
assign a first thread to the first execution domain;
generate a first translation region metadata associated with a first binary code of a program associated with the first thread, wherein the first translation region metadata comprises control flow data of the first binary code;
store the first translation region metadata associated with the first binary code of the program associated with the first thread in the global region cache;
translate, by the first thread, the first binary code of the program associated with the first thread using the first translation region metadata to generate a first prototype code;
install the first prototype code associated with the first binary code of the program associated with the first thread into the global prototype cache in response to translating the first binary code of the program associated with the first thread to generate the first prototype code; and
install, by the first thread, a first translated binary code, based on the first prototype code, into the first translation cache for execution by the first thread in response to installing the first prototype code into the global prototype cache, wherein the first prototype code comprises a non-executable version of the first translated binary code.

14. The one or more non-transitory, computer-readable storage media of claim 13,
wherein the global region cache is shared by threads associated with any execution domain of the computing device.

15. The one or more non-transitory, computer-readable storage media of claim 13, further comprising a plurality of instructions that in response to being executed cause the computing device to:
allocate a second translation cache, wherein the second translation cache is shared by all threads associated with a second execution domain of the computing device;
assign a second thread to the second execution domain;
translate a second binary code of the program associated with the second thread to generate a second translated binary code; and
install the second translated binary code into the second translation cache for execution.

16. The one or more non-transitory, computer-readable storage media of claim 15, further comprising a plurality of instructions that in response to being executed cause the computing device to:
generate a second translation region metadata associated with the second binary code of the program associated with the second thread; and
store the second translation region metadata associated with the second binary code of the program associated with the second thread in the global region cache in response to generating the second translation region metadata;
wherein to translate the second binary code of the program associated with the second thread to generate the second translated binary code comprises to translate the second binary code of the program associated with the second thread using the second translation region metadata to generate the second translated binary code.

17. The one or more non-transitory, computer-readable storage media of claim 15, further comprising a plurality of instructions that in response to being executed cause the computing device to:
install a second prototype code associated with the second binary code of the program associated with the second thread into the global prototype cache in response to translating the second binary code of the program associated with the second thread to generate the second translated binary code;
wherein to translate the second binary code of the program associated with the second thread comprises to translate the second binary code of the program associated with the second thread to generate the second prototype code, wherein the second prototype code comprises a non-executable version of the second translated binary code;
and
wherein to install the second translated binary code into the second translation cache for execution comprises to install the second translated binary code, based on the second prototype code, into the second translation cache in response to installing the second prototype code into the global prototype cache.

* * * * *